United States Patent
Miyoshi et al.

(10) Patent No.: US 7,295,698 B2
(45) Date of Patent: Nov. 13, 2007

(54) THREE-DIMENSIONAL IMAGE PHOTOGRAPHING APPARATUS AND METHOD CAPABLE OF ACQUIRING MORE NATURAL PASTED THREE-DIMENSIONAL IMAGE INCLUDING TEXTURE IMAGE

(75) Inventors: Takashi Miyoshi, Atsugi (JP); Kazuhiko Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 659 days.

(21) Appl. No.: 10/387,366

(22) Filed: Mar. 12, 2003

(65) Prior Publication Data

US 2003/0175024 A1 Sep. 18, 2003

(30) Foreign Application Priority Data

Mar. 13, 2002 (JP) .............................. 2002-069235

(51) Int. Cl.
*G06K 9/00* (2006.01)
*G06K 7/00* (2006.01)
(52) U.S. Cl. ........................ 382/154; 382/312
(58) Field of Classification Search ................ 382/154, 382/312
See application file for complete search history.

(56) References Cited

U.S. PATENT DOCUMENTS

| 5,864,640 | A | * | 1/1999 | Miramonti et al. | 382/312 |
| 5,912,739 | A | * | 6/1999 | Fowler et al. | 356/613 |
| 6,341,016 | B1 | * | 1/2002 | Malione | 356/603 |
| 6,628,819 | B1 | * | 9/2003 | Huang et al. | 382/154 |
| 6,792,140 | B2 | * | 9/2004 | Matusik et al. | 382/154 |
| 6,873,421 | B2 | * | 3/2005 | Lim et al. | 356/605 |
| 6,965,690 | B2 | * | 11/2005 | Matsumoto | 382/154 |
| 7,068,836 | B1 | * | 6/2006 | Rubbert et al. | 382/154 |
| 7,079,679 | B2 | * | 7/2006 | Kirk et al. | 382/154 |
| 7,102,666 | B2 | * | 9/2006 | Kanade et al. | 348/159 |
| 2002/0051006 | A1 | * | 5/2002 | Katagiri et al. | 345/653 |
| 2003/0066949 | A1 | * | 4/2003 | Mueller et al. | 250/208.1 |
| 2003/0091226 | A1 | * | 5/2003 | Cahill et al. | 382/154 |

FOREIGN PATENT DOCUMENTS

| JP | 61-76909 | 4/1986 |
| JP | 4-25758 | 5/1992 |
| JP | 8-293042 | 11/1996 |
| JP | 10-124704 | 5/1998 |
| JP | 2000-333209 | 11/2000 |
| JP | 2003-108985 | 4/2003 |
| WO | 2001-503514 | 3/2001 |

* cited by examiner

*Primary Examiner*—Andrew W. Johns
*Assistant Examiner*—Damon Conover
(74) *Attorney, Agent, or Firm*—Scully, Scott, Murphy & Presser, P.C.

(57) ABSTRACT

A three-dimensional image photographing apparatus acquires an image that includes shape information and texture information of an object, and acquires a three-dimensional image of the object by utilizing the image that includes the shape information and the texture information. A three-dimensional measuring device measures the three-dimensional shape of the object. An illumination device is disposed fixed at a predetermined position relative to the object and comprises an illumination light source and an optical system to illuminate the object. A texture image photographing device photographs a texture image of the object illuminated by the illumination device from a plurality of viewpoints.

1 Claim, 9 Drawing Sheets

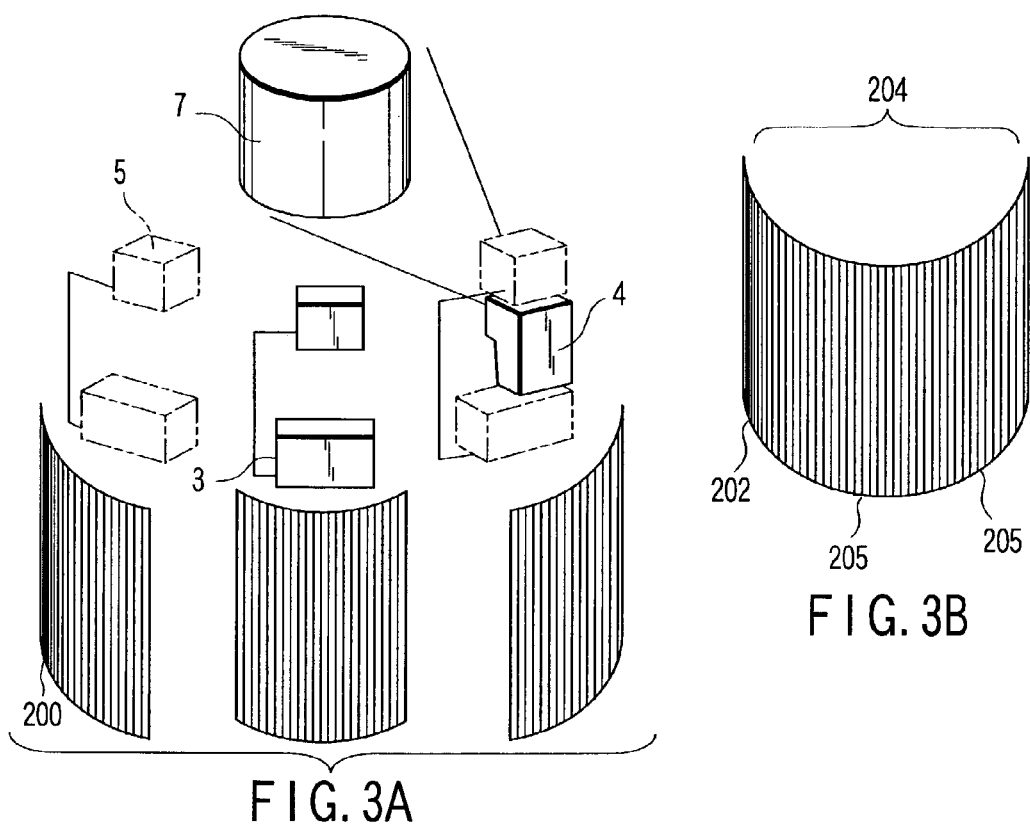
FIG. 3A
FIG. 3B
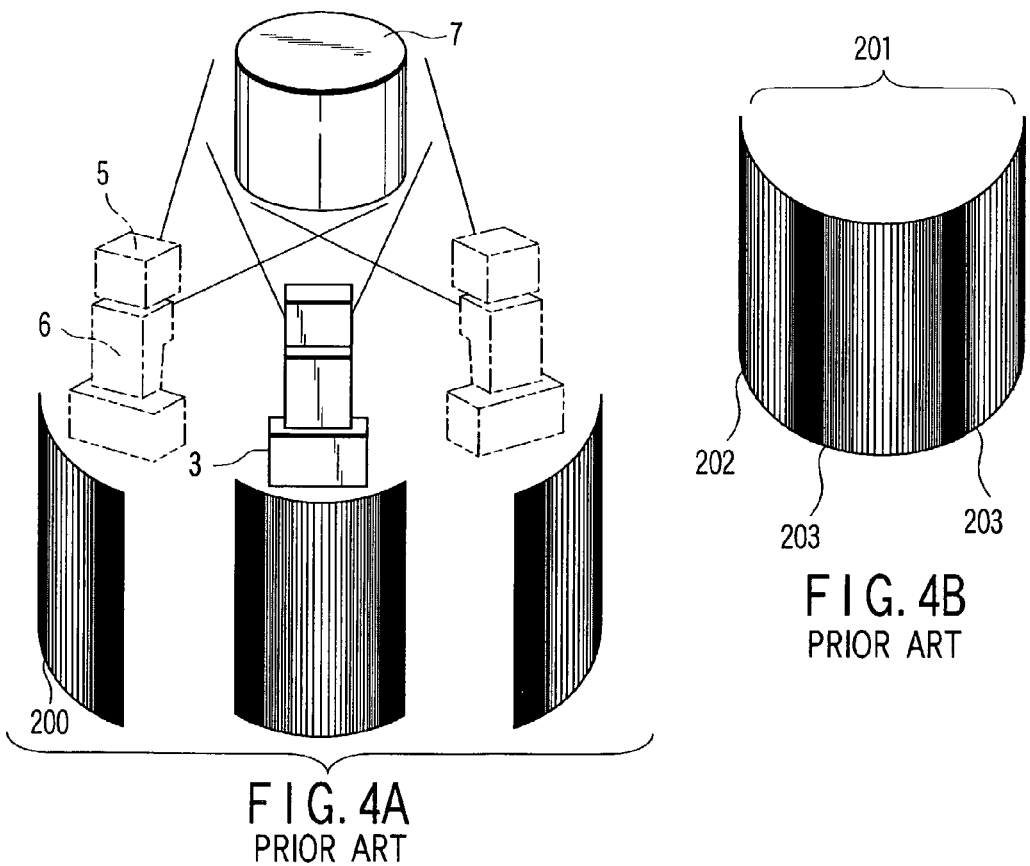
FIG. 4A
PRIOR ART
FIG. 4B
PRIOR ART

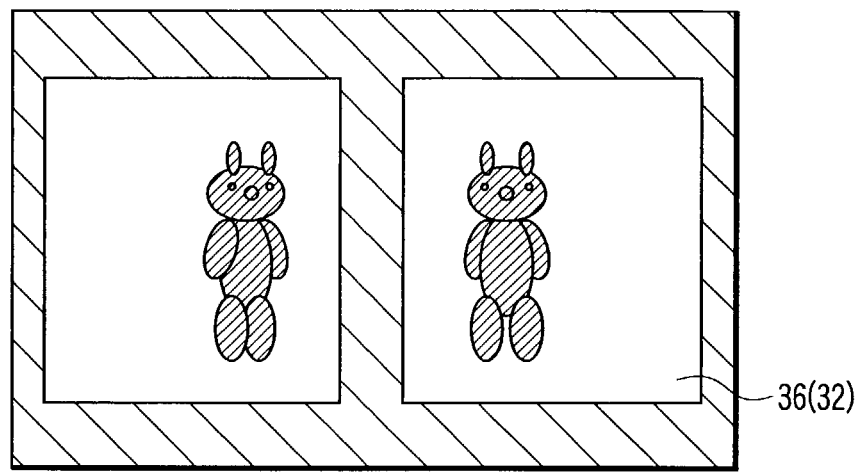
F I G. 7A
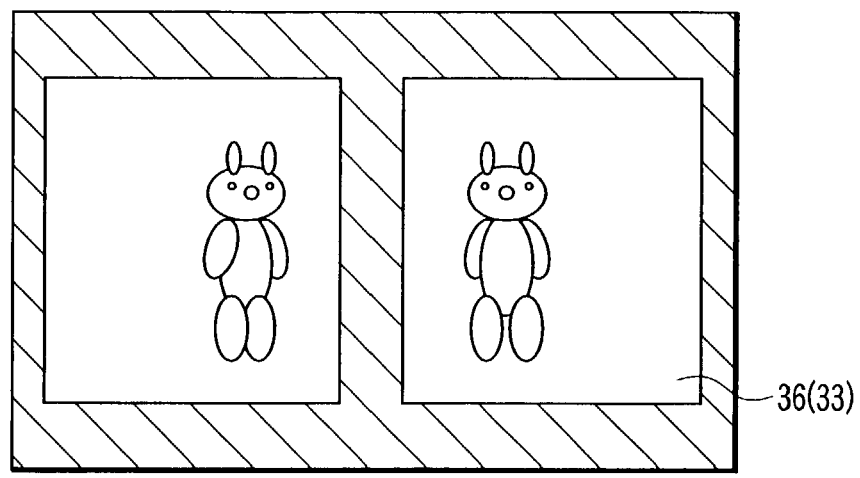
F I G. 7B

THREE-DIMENSIONAL IMAGE PHOTOGRAPHING APPARATUS AND METHOD CAPABLE OF ACQUIRING MORE NATURAL PASTED THREE-DIMENSIONAL IMAGE INCLUDING TEXTURE IMAGE

CROSS-REFERENCE TO RELATED APPLICATIONS

This application is based upon and claims the benefit of priority from the prior Japanese Patent Application No. 2002-69235, filed Mar. 13, 2002, the entire contents of which are incorporated herein by reference.

BACKGROUND OF THE INVENTION

1. Field of the Invention

The present invention relates to a three-dimensional image photographing apparatus and method that can be applied to a three-dimensional measuring device, and particularly, the invention relates to a three-dimensional image photographing apparatus and method having a texture image photographing device.

2. Description of the Related Art

Conventionally, as an apparatus for acquiring a three-dimensional image, for example, there is known a technique for carrying out pasting of a plurality of three-dimensional images, as disclosed in Jpn. Pat. Appln. KOKAI Publication No. 8-293042.

Further, as an apparatus for acquiring a three-dimensional image, for example, there is known a technique for coaxially carrying out illumination and projection on an object, thereby continuously exposing an image for reconstructing a three-dimensional shape and a texture image to be pasted thereon, as disclosed in Jpn. Pat. Appln. KOKAI Publication No. 2000-333209.

Furthermore, as an apparatus for acquiring a three-dimensional image, there is known a technique for reconstructing a three-dimensional shape by projecting a pattern on an object when there is a measurement disable point during stereoscopy, as disclosed in Jpn. Pat. Appln. KOKOKU Publication No. 4-25758 (Jpn. Pat. Appln. KOKAI Publication No. 59-182689).

In addition, as an apparatus for acquiring a three-dimensional image, for example, there is known a technique for placing an object on a rotation table and rotating it, thereby measuring the three-dimensional shape of such an object, as disclosed in Jpn. Pat. Appln. KOKAI Publication No. 10-124704.

BRIEF SUMMARY OF THE INVENTION

It is an object of the present invention to provide a three-dimensional image photographing apparatus and method considering pasting of a texture image as a first object, the apparatus and method decreasing the computer correction processing cost when three-dimensional texture images with their different viewpoints as second and third objects is pasted, the apparatus and method being capable of acquiring a more natural pasted three-dimensional image.

In order to achieve the above object, according to a first aspect of the present invention, there is provided a three-dimensional image photographing apparatus for acquiring an image that includes shape information and texture information of an object, and acquiring a three-dimensional image of the object by utilizing the image that includes the shape information and the texture information, the apparatus comprising:

a three-dimensional measuring device which measures the three-dimensional shape of the object;

an illumination device which is disposed and fixed at a predetermined position relative to the object, comprises an illumination light source and an optical system, and illuminates the object; and a texture image photographing device which photographs a texture image of the object illuminated by the illumination device from a plurality of viewpoints.

In the invention according to the first aspect, the three-dimensional shaped image and texture image of an object are photographed from a plurality of viewpoints under illumination conditions in which no change substantially occurs with the object, a three-dimensional shape from the plurality of viewpoints is generated, and a texture image is pasted.

In this manner, in the invention according to the first aspect, the illumination conditions when texture images are photographed with respect to the object are uniform. Thus, even in image photographing from a plurality of viewpoints, continuity of luminance of the texture images is maintained, and a pasted texture image and a three-dimensional shape can be obtained more naturally compared with those in the prior art.

In order to achieve the above object, according to a second aspect of the present invention, there is provided a three-dimensional image photographing apparatus according to the first aspect, wherein the three-dimensional image measuring device includes:

a pattern projection device which comprises a pattern projection light source and an optical system, and projects a pattern on the object; and a shape information image photographing device which is disposed to be spaced from the pattern projection device by a predetermined distance, and photographs an image of the object while the pattern projection device projects a pattern on the object, and the three-dimensional image photographing apparatus further comprises a switching device which switches ON/OFF states of the illumination light source and the pattern projection light source.

In the invention according to the second aspect, a stationary illumination device is substantially mounted on an object, and illumination image data is photographed. In this manner, no change occurs with an object lighting state when an image is photographed while changing the viewing position of the image photographing apparatus.

In the invention according to the second aspect, an image is photographed in a lighting state fixed relevant to the object. Thus, the light quantity distribution at the pasting end portion does not significantly change even if the viewpoint is changed. In addition, as in the prior art, since a change in lighting strength due to a change in distance from the object is restricted, a change in luminance of a texture image does not occur.

Therefore, in the invention according to the second aspect, the computer correction processing cost for pasting or fusion of texture images can be reduced, thereby enabling pasting of a texture image in conjunction with pasting of a more natural three-dimensional shape.

In order to achieve the above object, according to a third aspect of the present invention, there is provided a three-dimensional image photographing apparatus according to the first aspect, further comprising a rotating device which causes the object to carry out rotational motion having a rotation axis in a direction different from a direction of an optical axis of the texture image photographing device relative to the texture image photographing device, and which maintains the object and the illumination device at a relatively constant position.

In the invention according to the third aspect, a light source rotates together with the object, or there is provided an illumination axially symmetrical to a rotation axis. Thus, the light source position does not change relative to the object depending on the rotation angle of a rotating device. Therefore, substantially fixed lighting is achieved relevant to the object.

In the invention according to the third aspect, images with their constant luminance distribution on the object surface can be photographed. Thus, the computer correction processing cost for pasting or fusion of a texture image is reduced, thereby enabling pasting of a texture image in conjunction with pasting of a more natural three-dimensional shape.

In addition, in the invention according to the third aspect, the three-dimensional shape all around an object can be easily obtained by a rotating device.

In order to achieve the above object, according to a fourth aspect of the present invention, there is provided a three-dimensional image photographing apparatus according to the first aspect, wherein the rotating device includes:

a rotation table device on which the object is placed and which rotates the same;

an illumination rotating device which rotates the illumination device; and a synchronizing device which synchronizes rotations of the rotation table device and the illumination rotating device, and then fixes relative positions of the object and the illumination device.

In the invention according to the forth aspect, a light source rotates together with the object, or there is provided an illumination axially symmetrical to a rotation axis. Thus, the light source position does not change relative to the object depending on the rotation angle of the rotating device. Therefore, substantially fixed lighting is achieved relevant to the object.

In this manner, in the present invention according to the fourth aspect, an image with its uniform luminance distribution on an object surface can be photographed. Thus, the computer correction processing cost for pasting or fusion of a texture image is reduced, thereby enabling pasting of a texture image in conjunction with pasting of a more natural three-dimensional shape.

In addition, in the invention according to the fourth aspect, the three-dimensional shape all around the object can be easily obtained by a rotating device.

In order to achieve the above object, according to a fifth aspect of the present invention, there is provided a three-dimensional image photographing apparatus for acquiring an image that includes shape information and texture information of an object, and acquiring a three-dimensional image of the object by utilizing the image that includes the shape information and the texture information, the apparatus comprising:

a pattern projection device which comprises a pattern projection light source and an optical system, and projects a pattern on the object during shape information acquisition;

an image photographing device which is disposed and fixed to be relatively spaced from the pattern projection device by a predetermined distance, and photographs an image of the object;

an illumination device which is disposed and fixed at a predetermined position relative to the object, comprises an illumination light source and an optical system, and illuminates the object; and a switching device which switches ON/OFF states of the pattern projection light source and the illumination light source, wherein the pattern projection light source is turned ON, thereby photographing an image of an object having the pattern projected thereon from a plurality of viewpoints, and the illumination light source is turned ON, thereby photographing a texture image of the object from a plurality of viewpoints.

In the present invention according to the fifth aspect, a stationary illumination device is substantially mounted on the object, and an image of the object illuminated by the illumination device is photographed. In this manner, no change occurs with the object lighting state when an image is photographed while changing the viewing position of the image photographing apparatus.

In the invention according to the fifth aspect, since an image is photographed in a lighting state fixed relevant to the object, the light quantity distribution at the pasting end portion does not significantly change even if the viewpoint is changed. In addition, as in the prior art, since a change in lighting strength due to a change in distance from the object is restricted, a change in luminance of a texture image does not occur.

Therefore, in the invention according to the fifth aspect, the computer correction processing cost for pasting or fusion of texture images can be reduced, thereby enabling pasting of a texture image in conjunction with pasting of a more natural three-dimensional shape.

In order to achieve the above object, according to a sixth aspect of the present invention, there is provided a three-dimensional image photographing apparatus according to the fifth aspect, further comprising a rotating device which causes the object to carry out rotational motion having a rotation axis in a direction different from a direction of an optical axis of the image photographing device relative to the image photographing device and which maintains the object and the illumination device at a relatively constant position.

In the invention according to the sixth aspect, a light source rotates together with the object, or there is provided an illumination axially symmetrical to a rotation axis. Thus, the light source position does not change relative to the object depending on the rotation angle of the rotating device. Therefore, substantially fixed lighting is achieved relevant to the object.

In this manner, in the invention according to the sixth aspect, an image with its uniform luminance distribution on an object surface can be photographed as a uniform light quantity distribution in the circumferential direction of a rotation axis. Thus, the computer correction processing cost for pasting or fusion of a texture image is reduced, thereby enabling pasting of a texture image in conjunction with pasting of a more natural three-dimensional shape.

In order to achieve the above object, according to a seventh aspect of the present invention, there is provided a three-dimensional image photographing apparatus according to the sixth aspect, wherein the rotating device includes:

a rotation table device on which the object is placed and which rotates the same;

an illumination rotating device which rotates the illumination device; and a synchronizing device which synchronizes rotations of the rotation table device and the illumination rotating device, and then fixes relative positions of the object and the illumination device.

In the invention according to the seventh aspect, a light source rotates together with the object, or there is provided an illumination axially symmetrical to a rotation axis. Thus, the light source position does not change relative to the object depending on the rotation angle of the rotating device. Therefore, substantially fixed lighting is achieved relevant to the object.

In this manner, in the invention according to the seventh aspect, an image with its uniform luminance distribution on an object surface can be photographed. Thus, the computer correction processing cost for pasting or fusion of a texture image is reduced, thereby enabling pasting of a texture image in conjunction with pasting of a more natural three-dimensional shape.

In addition, in the invention according to the seventh aspect, the three-dimensional shape all around the object can be easily obtained by a rotating device.

In order to achieve the above object, according to an eighth aspect of the present invention, there is provided a three-dimensional image photographing apparatus for acquiring an image that includes shape information and texture information of an object, and acquiring a three-dimensional image of the object by utilizing the image that includes the shape information and the texture information, the apparatus comprising:

a pattern projection device which comprises a pattern projection light source and an optical system, and projects a pattern on the object during shape information acquisition;

an image photographing device which is disposed and fixed to be relatively spaced from the pattern projection device by a predetermined distance, and photographs an image of the object;

a rotating device which causes the object to carry out rotational motion having a rotation axis in a direction difference from a direction of an optical axis of the image photographing device;

an illumination device which comprises an illumination light source and an optical system and has a uniform light quantity distribution in a circumferential direction of the rotation axis and illuminates the object; and a switching device which switches ON/OFF states of the pattern projection light source and the illumination light source, wherein the pattern projection light source is turned ON, thereby photographing an image of an object having the pattern projected thereon from a plurality of viewpoints and the illumination light source is turned ON, thereby photographing a texture image of the object from a plurality of viewpoints.

In the invention according to the eighth aspect, a light source rotates together with the object, or there is provided an illumination axially symmetrical to a rotation axis. Thus, the light source position does not change relative to the object depending on the rotation angle of the rotating device. Therefore, substantially fixed lighting is achieved relevant to the object.

In this manner, in the invention according to the eighth aspect, an image with its uniform luminance distribution on an object surface can be photographed as a uniform light quantity distribution in the circumferential direction of a rotation axis. Thus, the computer correction processing cost for pasting or fusion of a texture image is reduced, thereby enabling pasting of a texture image in conjunction with pasting of a more natural three-dimensional shape.

In addition, in the invention according to the eighth aspect, the three-dimensional shape all around the object can be easily obtained by a rotating device.

In order to achieve the above object, according to a ninth aspect of the present invention, there is provided a three-dimensional image photographing method for acquiring an image that includes shape information and texture information of an object, and acquiring a three-dimensional image of the object by utilizing the image that includes the shape information and the texture information, the method comprising:

measuring a three-dimensional shape of the object;

illuminating the object by an illumination device which is disposed and fixed at a predetermined position relative to the object, and comprises an illumination light source and an optical system; and causing a texture image photographing device to photograph a texture image of the object illuminated by the illumination device from a plurality of viewpoints.

In the invention according to the ninth aspect, the three-dimensional shaped image and texture image are photographed from a plurality of viewpoints under illumination conditions in which no change substantially occurs with an object; a three-dimensional shape from the plurality of viewpoints is generated, and a texture image is pasted.

In this manner, in the invention according to the ninth aspect, the illumination conditions when texture images are photographed with respect to the object are uniform. Thus, even in photographing from a plurality of viewpoints, continuity of luminance of the texture images is maintained. In addition, a pasted texture image and a three-dimensional shape can be obtained more naturally as compared with those in the prior art.

In order to achieve the above object, according to a tenth aspect of the present invention, there is provided a three-dimensional image photographing method according to the ninth aspect, wherein the three-dimensional shape measurement includes:

projecting a pattern on the object by a pattern projection device which comprises a pattern projection light source and an optical system; and photographing an image of the object while the pattern is projected on the object, by a shape information image photographing device disposed to be spaced from the pattern projection device by a predetermined distance, and the three-dimensional image photographing method further comprises: switching ON/OFF states of the illumination light source and the pattern projection light source.

In the invention according to the tenth aspect, a stationary illumination device is substantially mounted on an object, and an image of the object illuminated by the illumination device is photographed. In this manner, no change occurs with an object lighting state when an image is photographed while changing the viewing position of the image photographing apparatus.

In the invention according to the tenth aspect, since an image is photographed in a lighting state fixed relevant to an object, the light quantity distribution at the pasting end portion does not significantly change even if the viewpoint is changed. In addition, as in the prior art, since a change in lighting strength due to a change in distance from the object is restricted, a change in luminance of a texture image does not occur.

Therefore, in the present invention according to the tenth aspect, the computer correction processing cost for pasting or fusion of texture images can be reduced, thereby enabling pasting of a texture image in conjunction with pasting of a more natural three-dimensional shape.

In order to achieve the above object, according to an eleventh aspect of the present invention, there is provided a three-dimensional image photographing method according to the ninth aspect, further comprising: causing the object to carry out rotational motion having a rotation axis in a direction different from a direction of an optical axis of the texture image photographing device relevant to the texture image photographing device by means of a rotating device; and maintaining the object and the illumination device at a relatively constant position.

In the invention according to the eleventh aspect, the light source rotates together with the object, or there is provided an illumination axially symmetrical to a rotation axis. Thus, the light source position does not change relative to an object, depending on the rotation angle of a rotating device. Therefore, substantially fixed lighting is achieved relevant to the object.

In the invention according to the eleventh aspect, images with their constant luminance distribution on an object surface can be photographed. Thus, the computer correction processing cost for pasting or fusion of a texture image is reduced, thereby enabling pasting of a texture image in conjunction with pasting of a more natural three-dimensional shape.

In addition, in the invention according to the eleventh aspect, the three-dimensional shape all around the object can be easily obtained by a rotating device.

In order to achieve the above object, according to a twelfth aspect of the present invention, there is provided a three-dimensional image photographing method according to the ninth aspect, wherein the rotating device rotates a rotation table device having the object placed thereon and rotates the illumination device, and synchronizes rotations of the rotating table device and the illumination device, thereby fixing relative positions of the object and the illumination device.

In the invention according to the twelfth aspect, a light source rotates together with the object, or there is provided an illumination axially symmetrical to a rotation axis. Thus, the light source position does not change relative to the object, depending on the rotation angle of a rotating device. Therefore, substantially fixed lighting is achieved relevant to the object.

In the invention according to the twelfth aspect, images with their constant luminance distribution on an object surface can be photographed. Thus, the computer correction processing cost for pasting or fusion of a texture image is reduced, thereby enabling pasting of a texture image in conjunction with pasting of a more natural three-dimensional shape.

In addition, in the invention according to the twelfth aspect, the three-dimensional shape all around the object can be easily obtained by a rotating device.

In order to achieve the above object, according to a thirteenth aspect of the present invention, there is provided a three-dimensional image photographing method for acquiring an image that includes shape information and texture information of an object, and acquiring a three-dimensional image of the object by utilizing the image that includes the shape information and the texture information, the method comprising:

projecting a pattern on the object during shape information acquisition by means of a pattern projection device which comprises a pattern projection light source and an optical system;

photographing an image of the object by means of an image photographing device which is disposed and fixed to be spaced from the pattern projection device by a predetermined distance;

illuminating the object by means of an illumination device which is disposed and fixed at a predetermined position relative to the object, and comprises an illumination light source and an optical system; and switching ON/OFF states of the pattern projection light source and the illumination light source, wherein the pattern projection light source is turned ON, thereby photographing from a plurality of viewpoints an image of an object having the pattern projected thereon from a plurality of viewpoints, and the illumination light source is turned ON, thereby photographing a texture image of the object from a plurality of viewpoints.

In the present invention according to the thirteenth aspect, a stationary illumination device is substantially mounted on the object, and illumination image data is photographed. In this manner, no change occurs with an object lighting state when an image is photographed while changing the viewing position of the image photographing apparatus.

In the present invention according to the thirteenth aspect, an image is photographed in a lighting state fixed relevant to an object. Thus, the light quantity distribution at the pasting end portion does not significantly change even if the viewpoint is changed. In addition, as in the prior art, a change in lighting strength due to a change in distance from the object is restricted. Thus, a change in luminance of a texture image does not occur.

Therefore, in the invention according to the thirteenth aspect, the computer correction processing cost for pasting or fusion of texture images can be reduced, thereby enabling pasting of a texture image in conjunction with pasting of a more natural three-dimensional shape.

In order to achieve the above object, according to a fourteenth aspect of the present invention, there is provided a three-dimensional image photographing method according to the thirteenth aspect, further comprising: causing the object to carry out rotational motion having a rotation axis in a direction different from a direction of an optical axis of the texture image photographing device relevant to the texture image photographing device by means of a rotating device; and maintaining the object and the illumination device at a relatively constant position.

In the invention according to the fourteenth aspect, a light source rotates together with the object, or there is provided an illumination axially symmetrical to a rotation axis. Thus, the light source position does not change relative to the object, depending on the rotation angle of a rotating device. Therefore, substantially fixed lighting is achieved relevant to the object.

In the invention according to the fourteenth aspect, images with their constant luminance distribution on an object surface can be photographed. Thus, the computer correction processing cost for pasting or fusion of a texture image is reduced, thereby enabling pasting of a texture image in conjunction with pasting of a more natural three-dimensional shape.

In addition, in the invention according to the fourteenth aspect, the three-dimensional shape all around the object can be easily obtained by a rotating device.

In order to achieve the above object, according to a fifteenth aspect of the present invention, there is provided a three-dimensional image photographing method according to fourteenth aspect, wherein the rotating device rotates a rotation table device having the object placed thereon and rotates the illumination device, and synchronizes rotations of the rotating table device and the illumination device, thereby fixing relative positions of the object and the illumination device.

In the invention according to the fifteenth aspect, the light source rotates together with the object, or there is provided an illumination axially symmetrical to a rotation axis. Thus, the light source position does not change relative to the object, depending on the rotation angle of a rotating device. Therefore, substantially fixed lighting is achieved relevant to the object.

In the invention according to the fifteenth aspect, images with their constant luminance distribution on an object surface can be photographed. Thus, the computer correction processing cost for pasting or fusion of a texture image is reduced, thereby enabling pasting of a texture image in conjunction with pasting of a more natural three-dimensional shape.

In addition, in the present invention according to the fifteenth aspect, the three-dimensional shape all around the object can be easily obtained by a rotating device.

In order to achieve the above object, according to a sixteenth aspect of the present invention, there is provided a three-dimensional image photographing method for acquiring an image that includes shape information and texture information of an object, and then, acquiring a three-dimensional image of the object by utilizing the image that includes the shape information and the texture information, the method comprising:

projecting a pattern on the object during shape information acquisition by means of a pattern projection device comprising a pattern projection light source and an optical system;

photographing an image of the object by means of an image photographing device which is disposed and fixed to be relatively spaced from the pattern projection device by a predetermined distance;

causing the object to carry out rotational motion having a rotation axis in a direction different from a direction of an optical axis of the image photographing device by means of a rotating device;

illuminating the object by means of an illumination device comprising an illumination light source and an optical system with a uniform light quantity distribution in a circumferential direction of the rotation axis; and switching ON/OFF states of the pattern projection light source and the illumination light source, wherein the pattern projection light source is turned ON, thereby photographing an image of an object having the pattern projected thereon from a plurality of viewpoints, and the illumination light source is turned ON, thereby photographing a texture image of the object from a plurality of viewpoints.

In the invention according to the sixteenth aspect, a light source rotates together with the object, or there is provided an illumination axially symmetrical to a rotation axis. Thus, the light source position does not change relative to an object, depending on the rotation angle of a rotating device. Therefore, substantially fixed lighting is achieved relevant to the object.

In the invention according to the sixteenth aspect, images with their constant luminance distribution on the object surface can be photographed. Thus, the computer correction processing cost for pasting or fusion of a texture image is reduced, thereby enabling pasting of a texture image in conjunction with pasting of a more natural three-dimensional shape.

In addition, in the invention according to the sixteenth aspect, the three-dimensional shape all around the object can be easily obtained by a rotating device.

In order to achieve the above object, according to a seventeenth aspect of the present invention, there is provided a three-dimensional image photographing apparatus for acquiring an image that includes shape information and texture information of an object, and acquiring a three-dimensional image of the object by utilizing the image that includes the shape information and the texture information, the apparatus comprising:

three-dimensional measuring means for measuring a three-dimensional shape of the object;

illumination means for illuminating the object, the illumination means being disposed and fixed at a predetermined position relative to the object, and comprising an illumination light source and an optical system; and a texture image photographing means for photographing a texture image of the object illuminated by the illumination device from a plurality of viewpoints.

The invention according to the seventeenth aspect has the same advantage as the invention according to the first aspect.

In order to achieve the above object, according to an eighteenth aspect of the present invention, there is provided a three-dimensional image photographing apparatus for acquiring an image that includes shape information and texture information of an object, and acquiring a three-dimensional image of the object by utilizing the image that includes the shape information and the texture information, the apparatus comprising:

pattern projection means for projecting a pattern on the object during shape information acquisition, the pattern projection means comprising a pattern projection light source and an optical system;

image photographing means for photographing an image of the object, the image photographing means being disposed and fixed to be relatively spaced from the pattern projection device by a predetermined distance;

illumination means for illuminating the object, the illumination means being disposed and fixed at a predetermined position relative to the object and comprising an illumination light source and an optical system; and switching means for switching ON/OFF states of the pattern projection light source and the illumination light source, wherein the pattern projection light source is turned ON, thereby photographing an image of an object having the pattern projected thereon from a plurality of viewpoints, and the illumination light source is turned ON, thereby photographing a texture image of the object from a plurality of viewpoints.

The invention according to the eighteenth aspect has the same advantage as the invention according to the fifth aspect.

In order to achieve the above object, according to a nineteenth aspect of the present invention, there is provided a three-dimensional image photographing apparatus for acquiring an image that includes shape information and texture information of an object, and acquiring a three-dimensional image of the object by utilizing the image that includes the shape information and the texture information, the apparatus comprising:

pattern projection means for projecting a pattern on the object during shape information acquisition, the pattern projection means comprising a pattern projection light source and an optical system;

image photographing means for photographing an image of the object, the image photographing means being disposed and fixed to be relatively spaced from the pattern projection device by a predetermined distance;

rotating means for causing the object to carry out rotational motion having a rotation axis in a direction different from a direction of an optical axis of the image photographing means;

illumination means for illuminating the object, the illumination means being disposed and fixed at a predetermined position relative to the object and comprising an illumination light source and an optical system; and switching means for switching ON/OFF states of the pattern projection light source and the illumination light source, wherein the pattern projection light source is turned ON, thereby photographing an image of the object having the pattern projected thereon from a plurality of viewpoints, and the illumination light source is turned ON, thereby photographing a texture image of the object from a plurality of viewpoints.

The invention according to the nineteenth aspect has the same advantage as the invention according to the eighth aspect.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIGS. 3A and 3B are views showing a state in which solid three-dimensional images 200, 200, . . . are sequentially obtained by photographing in which a viewing position relevant to the object 7 has been changed by the three-dimensional image photographing apparatus 1 according to the first embodiment of the invention and a state in which subsequent pasting of a three-dimensional image is carried out;

FIGS. 4A and 4B are views showing a state in which solid three-dimensional images 200, 200, . . . are sequentially obtained by photographing in which a viewing position relevant to the object 7 has been changed in accordance with a prior art and a state in which subsequent pasting of a three-dimensional image is carried out;

FIGS. 7A and 7B are views each showing an azimuth difference image (as parallax image) 36 (32, 33) on an image pickup element obtained by a stereo adapter 35 for use in the three-dimensional image photographing apparatus 1 according to the second embodiment of the invention;

DETAILED DESCRIPTION OF THE INVENTION

Figure 1A:
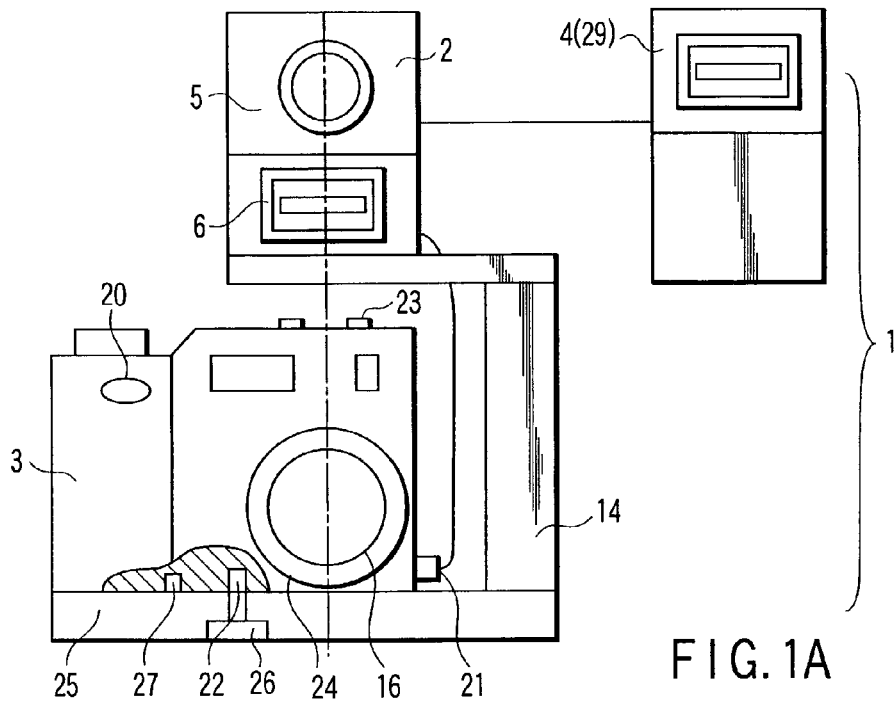
FIG. 1A is a front view showing a schematic configuration of an image photographing apparatus in a three-dimensional image photographing apparatus according to a first embodiment of the present invention.

Reference will now be made in detail to the presently preferred embodiments of the invention as illustrated in the accompanying drawings, in which like reference numerals designate like or corresponding parts.

Hereinafter, preferred embodiments of the present invention will be described with reference to the accompanying drawings.

First Embodiment

First, a configuration of an apparatus and method for photographing a three-dimensional image according to a first embodiment of the present invention will be described with reference to FIGS. 1A, 1B, and 1C.

FIG. 1A is a front view showing a schematic configuration of an image photographing apparatus in the three-dimensional image photographing apparatus according to the first embodiment.

Figure 1B:
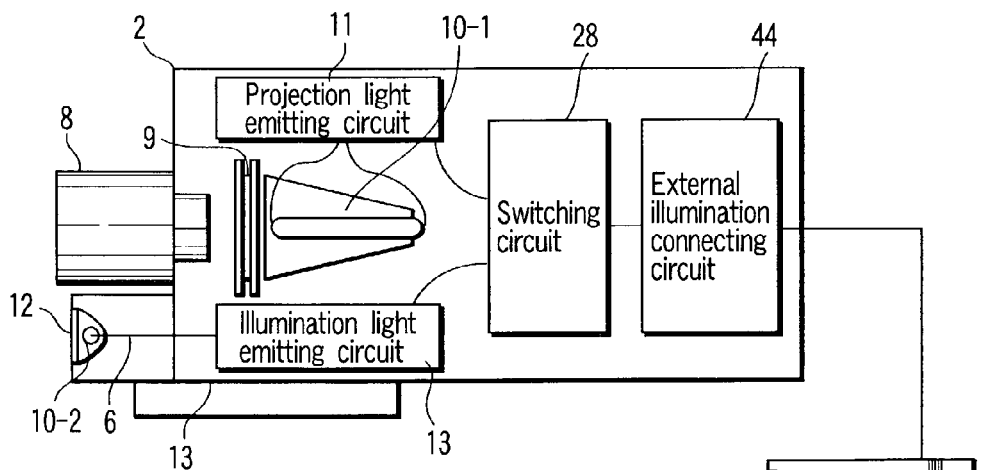
FIG. 1B is a view showing schematic connectivity of the three-dimensional image photographing apparatus according to the first embodiment of the invention.

FIG. 1B is a view showing schematic connectivity of the three-dimensional image photographing apparatus according to the first embodiment.

Figure 1C:
FIG. 1C is a view illustrating a pattern filter for use in a the three-dimensional image photographing apparatus according to the first embodiment of the invention.

FIG. 1C is a view illustrating a pattern filter for use in the three-dimensional image photographing apparatus according to the first embodiment.

The three-dimensional image photographing apparatus 1 according to the first embodiment of the invention is configured as follows.

That is, as shown in FIG. 1A, the three-dimensional image photographing apparatus 1 according to the present embodiment comprises a projection device 2, a photographing device 3, and an illumination device 4.

Here, the projection device 2 has a projection optical system 5 and an illumination optical system 6.

An object 7 (refer to FIG. 2) is photographed as an image by using this three-dimensional image photographing apparatus 1.

In addition, as shown in FIG. 1B, the projection optical system 5 has: an image forming optical system 8 that includes an image forming lens or mirrors; and a pattern filter 9 that has a geometrical pattern with its predetermined transmission rate disposed on a focusing face of the optical system.

In the present embodiment, a pattern projection technique using a stripe phase is used. Thus, as the pattern filter 9, there is used a stripe pattern filter that has been coded in a stripe shape as shown in FIG. 1C.

As shown in FIG. 1B, at a position at which the pattern filter 9 is sandwiched, the position being opposite to the image forming optical system 8, there is disposed a light source device 10-1 that includes an Xe tube for illuminating the pattern filter 9 and a light source optical system that includes a mirror or a lens.

This light source device 10-1 is connected to a projection light emitting circuit 11, and is controlled such that a desired amount of light emission can be obtained.

Further, the illumination optical system 6 comprises: a light source device 10-2 that includes an Xe tube and a reflector; a lens for illuminating the light from the light source device 10-2 on the object 7 (refer to FIG. 2); and a diffuser 12 that includes a diffusing plate.

This light source device 10-2 is connected to an illumination light emitting circuit 12, and is controlled such that a desired amount of light emission can be obtained.

Here, as shown in FIG. 1A, the projection optical system 5 and illumination optical system 6 are fixed in predetermined arrangement relevant to a photographing device 3 by means of an L-shaped fixing member 14 mounted on one end of a fixing jig 25 described later.

Figure 2:
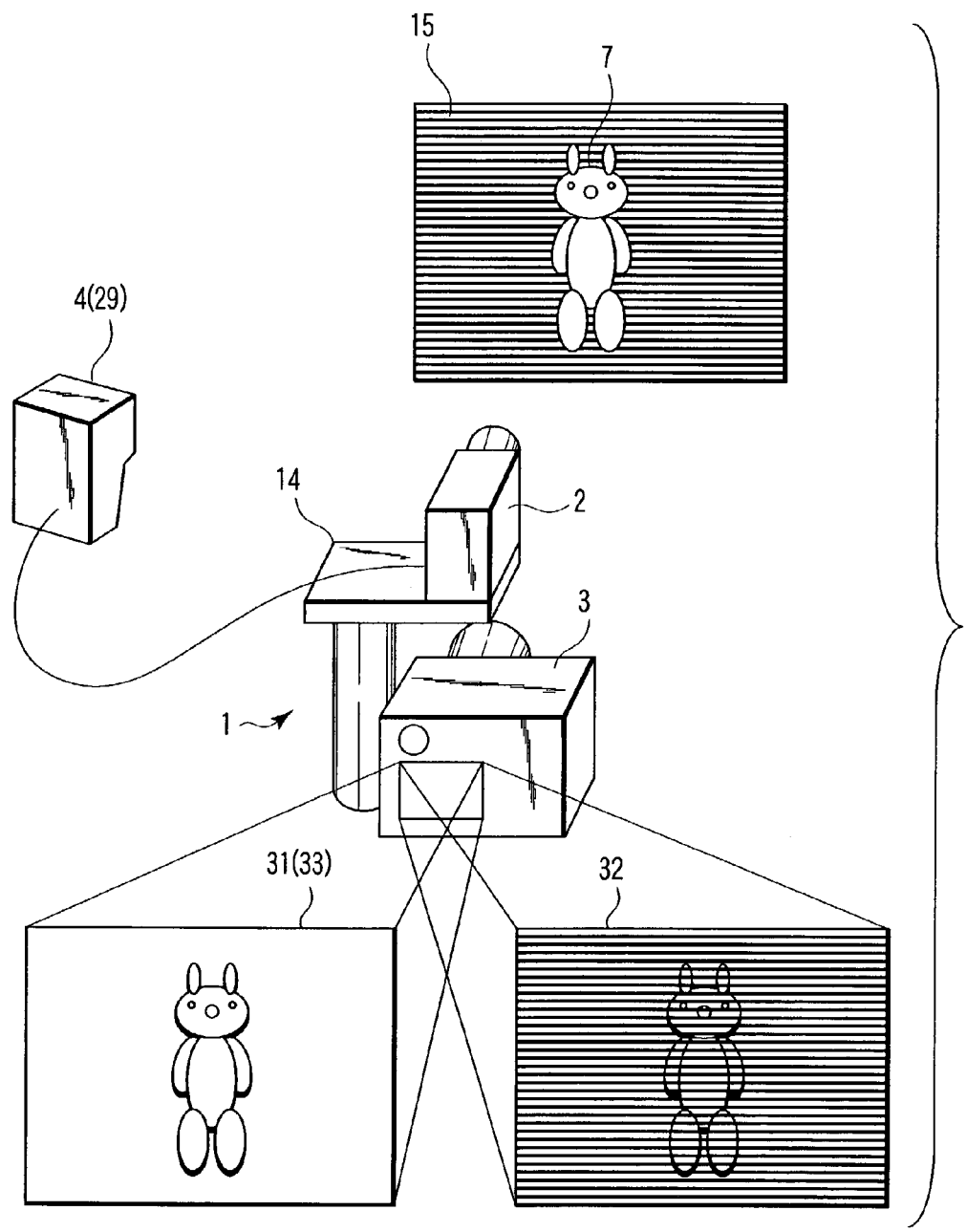
FIG. 2 is a view showing a state in which three-dimensional photographing is carried out relevant to an object 7 by using the three-dimensional image photographing apparatus 1 according to the first embodiment of the invention.

That is, the projection optical system 5 is disposed in a direction such that its optical axis can project a pattern filter image 15 (refer to FIG. 2) on the object 7 (refer to FIG. 2).

In addition, the illumination optical system 6 is disposed so as to face in a direction such that the object 7 (refer to FIG. 2) can be illuminated.

In the present embodiment, the projection optical system 5 and illumination optical system 6 are configured such that an optical axis is arranged in substantially parallel to these systems.

The photographing device 3 comprises a digital still camera (hereinafter referred to as a camera 3), for example. As shown in FIG. 1A, the device 3 has a photographing optical system 16, an image pickup element (not shown), a shutter (not shown), a diaphragm (not shown), a shutter button 20, and an externally provided flash control terminal 21 (hereinafter, referred to as an X synchronizing terminal 21).

The camera 3 has at least one of a tripod fixing screw hole 22 for use in connection of a peripheral device, an accessory shoe 23 for use in flash mounting, a filter mounting screw 24 and the like.

The projection device 2 and camera 3 are fixed by the fixing jig 25 using the tripod fixing screw hole 22 of the camera 3.

This fixing jig 25 is tightened with the camera 3 by a tripod fixing screw 26, whereby the jig is pushed to be abutted against the driving direction of the tripod fixing screw 26, and is positioned. In the illustrated case, the fixing jig 25 is positioned in a rotational direction as well by a positioning pin 27 for restricting a movement in the screw rotation direction of the tripod fixing screw 26. Then, the photographing optical system 16 of the camera 3, the projection device 2, the illumination optical system 6, and the projection optical system 5 are fixed to be disposed in predetermined positional relationship.

In addition, as shown in FIG. 1B, the projection device 2 has a switching circuit 28.

When an X synchronizing signal is input from the X synchronizing terminal 21 of the camera 3, this switching circuit 28 switches and inputs a light emitting instruction to the projection light emitting circuit 11 and the illumination light emitting circuit 13 according to the input of the X synchronizing signal.

In the present embodiment, as shown in FIG. 1A, the projection optical system 5, the illumination optical system 6, and the photographing optical system 16 are disposed to be arranged in a substantially linear manner.

Further, the light source device 10-1 of the projection optical system 5 and the light source device 10-2 of the illumination optical system 6, both of which are shown in FIG. 1B, are disposed at a position which is spaced by a baseline length from the photographing optical system 16 of the camera 3 shown in FIG. 1A.

Here, the stripe pattern of the pattern filter 9 shown in FIG. 1C is disposed in a direction which is substantially perpendicular to a baseline.

The illumination device 4 shown in FIGS. 1A and 1B is provided as a flash light emitting light source in the present embodiment. This device corresponds to a flash or the like that includes an Xe tube and a light emitting circuit.

For example, an externally provided flash 29 or the like is provided at the illumination device 4, and an external illumination connecting circuit 44 to be connected to the illumination device 4 is provided to be connected to the switching circuit 28 of the projection device 2. In this manner, the illumination device 4 is disposed at a position such that illumination at a constant position can be carried out relevant to the object 7 (refer to FIG. 2).

Now, effect of the three-dimensional image photographing apparatus 1 according to a first embodiment of the present invention will be described with reference to FIGS. 1A to 3B.

FIG. 2 is a view showing a state in which three-dimensional image photographing is carried out relevant to the object 7 by using the three-dimensional image photographing apparatus 1 according to the present embodiment configured as described above.

FIGS. 3A and 3B are views showing a state in which solid three-dimensional images 200, 200, . . . are sequentially photographed by photographing in which a viewing position relevant to the object 7 has been changed by the three-dimensional image photographing apparatus 1 according to the present embodiment configured as described above and a state in which subsequent pasting of three-dimensional images is carried out.

First, in the camera 3 configuring the three-dimensional image photographing apparatus 1 according to the present embodiment, when an instruction for photographing is provided by pressing the shutter button 20 (refer to FIG. 1A) with the above configuration, an X synchronizing signal for instructing light emission from the externally provided flash is output by the X synchronizing terminal 21 in synchronism with shutter opening.

This X synchronizing signal is input to the switching circuit 28 in the projection device 2.

This switching circuit 28 supplies a light emitting instruction to the illumination light emitting circuit 13 in a first photographing.

In this manner, the light source device 10-2 emits light, and the object 7 is illuminated by rays of light emitted by the illumination optical system 6.

Then, the light reflected by the object 7 is image-formed on the image pickup element by means of the photographing optical system 16 of the camera 3, whereby projection image data 31 without a projection pattern of the object 7 can be obtained.

Next, when the shutter button 20 is pressed in a time range such that the illumination optical system 6, camera 3, and object 7 do not substantially move in positional relationship. The X synchronizing signal outputted from the X synchronizing terminal 21 of the camera 3 is inputted to the switching circuit 28.

Here, the switching circuit 28 supplies a light emitting instruction to the projection light emitting circuit 11 at the time of the photographing.

In this manner, the light source device 10-1 emits light, and the light having transmitted the pattern filter 9 produces a projection pattern image on the object 7 by the image forming lens.

A projection pattern image 15 projected on the surface of the object 7 is formed on the image pickup element by the photographing optical system 16 of the camera 3, whereby projection image data 32 with a projection pattern of the object 7 can be obtained.

Further, a light emitting signal is sent to the external illumination connecting circuit 44 provided to be connected to the switching circuit 28 of the projection device 2. This causes the illumination device 4 to emit light, whereby third photographing is carried out.

By light emitting of this illumination device 4, illumination from a fixed light source is substantially carried out relevant to the object 7, and texture image data 33 can be obtained.

Under this condition, as shown in FIG. 3A, photographing in which a viewing position of the photographing optical system 16 of the camera 3 is changed is carried out relevant to the object 7. Thus, there can be obtained the texture image data 33 having received more uniform illumination by the illumination device 4 as well as the projection image data 31 without a projection pattern due to illumination caused by the illumination optical system 6 moving together with the camera 3.

The projection image data 32 with a projection pattern and the projection image data 31 without a projection pattern are captured by a computing device such as a personal computer (not shown), and differentiation processing of these items of data is carried out by this computing device. Then, the computing device is caused to execute the steps of extracting the projection pattern image 15 and measuring deformation of the projection pattern, whereby three-dimensional shape data on the object 7 can be obtained.

The above computing device is caused to execute the step of superimposing texture image data 33 that corresponds to the three-dimensional shape data, whereby solid three-dimensional images 200, 200, . . . can be sequentially obtained by photographing in which a viewing position has been changed as shown in FIG. 3A.

Then, as shown in FIG. 3B, the three-dimensional images 200, 200, . . . photographed by changing the viewing position are pasted, whereby a three-dimensional pasted image 201 of the object 7 is reconstructed.

In the present embodiment, as shown in FIGS. 3A and 3B, after the three-dimensional images 200 photographed by changing the viewing position are pasted, in the case of reconstructing a three-dimensional pasted image 204 of the object 7, for example, texture image data 33 photographed with an illumination being fixed is used as a surface texture image 202.

In this manner, in the present embodiment, a luminance difference at a pasting end 205 decreases in fusion of the texture images 202. Further, there can be obtained an image suitable to pasting of the object 7 which does not depend on a change in distance thereof from the viewing position, and a more natural three-dimensional pasted image 204 can be obtained.

FIGS. 4A and 4B are views showing a state in which solid three-dimensional images 200, 200, . . . are sequentially obtained by photographing in which a viewing position relevant to the object 7 has been changed in accordance with the prior art and a state in which subsequent pasting of a three-dimensional image is carried out.

In other words, in the case of the prior art, as shown in FIGS. 4A and 4B, in fusion of the surface texture image 202, a decrease in luminance at the periphery in each image occurs with the pasting end 203, or a decrease in a specific luminance value occurs due to a difference in illumination intensity caused by a difference in concave and convex image photographing distance of the object 7, whereby bright and dark matters occur discretely. Thus, an unnatural and low-resolution image can only be obtained in the three-dimensional pasted image 201 of the object 7.

This case corresponds to a case in which projection image data 31 without a projection pattern according to the present embodiment has been used as a texture image 202 of the object 7.

The present embodiment further provides the following specific effect.

Since a flash light emitting light source is used as a light source of the projection optical system 5, illumination optical system 6, and illumination device 4, a shuttering speed is increased, and external light effect is eliminated, whereby a projection pattern is photographed with a high contrast. Therefore, three-dimensional shape recognition can be performed more precisely.

In addition, photographing of texture image data 33 according to an arbitrary illumination state free of external light effect can be carried out by making best use of the disposition of the illumination device 4 or lighting.

Note that various variations or modifications can occur with configurations according to the embodiments of the present invention.

For example, in the above embodiment, the fixing jig 25 is configured so as to be fixed to the camera 3 by using the tripod fixing screw 26. However, there are provided: an accessory mount base of the camera specified in accordance with JISB7101 for use in mounting a flash light emitter of the camera 3 or the like, or a mount leg to be mounted on a generally called accessory shoe 23 (such as a flash shoe or an accessory shoe which conforms with the above standard). This element may be used as a fixing jig 25 for use in a mount portion of the camera 3 and projection device 2.

The mount portion may be provided with a locking mechanism by a fixing screw or the like which fasten the accessory shoe 23.

Further, a filter screw at the tip end of the lens may be used as the fixing jig 5.

In the above embodiment, for example, although a projection pattern image is photographed after a texture image of the object 7 has been photographed, this photographing order may be reversed. Further, the switching order may be changed such that an arbitrary pair can be selected from photographing of a plurality of images.

In addition, by adopting the camera 3 that has a continuous shooting function, a plurality of images may be continuously photographed one after another, by pushing down the shutter button 18 or the like one time.

By doing this, a distortion due to relative motion between the object 7 and the camera 3 can be decreased, and thus, the coincidence between three-dimensional shape data and texture image data is improved.

For shuttering releasing by the shutter button 18, the same advantageous effect may be achieved by using an extension release or using a remote release with a terminal signal for another shutter actuation or a remote control device.

In addition, the projection optical system 5 and illumination optical system 6 may be disposed to be significantly proximal to each other. In this case, a region in which an image can be acquired in a three-dimensional shape more significantly coincides with a region in which a texture image can be acquired without being shaded. Thus, this disposition is effective in extraction of the projection pattern image 15.

The illumination device 4 can, of course, be provided in plurality. These illumination devices may be disposed in any manner as long as they each are fixed at a relative position to the object to the object 7 depending on the shape or color of the object 7 or an image of the texture image data 33 to be pasted.

The illumination device 4 also does not hinder a lighting technique for photography in which a diffusion plate or the like is provided.

In the above described embodiment, photographing is carried out three times from one viewpoint. However, in the case where three-dimensional shape measurement suffice with only projection image data with a projection pattern caused by the projection device 4, it eliminates photographing due to illumination at the position of the camera 3 by the illumination optical system 6. Thus, it is sufficient to photograph two times from one viewpoint.

In this case, the illumination optical system 6 of the projection device 2 is eliminated. Thus, the illumination device 4 fixed to the object 7 and the projection device 2 that includes the projection optical system 4 mounted on the camera 3 are used as an aspect of the projection device 2.

Second Embodiment

Now, a second embodiment of an apparatus and method for acquiring a three-dimensional image according to the present invention will be described with reference to FIG. 5 to FIG. 7.

Figure 5A:
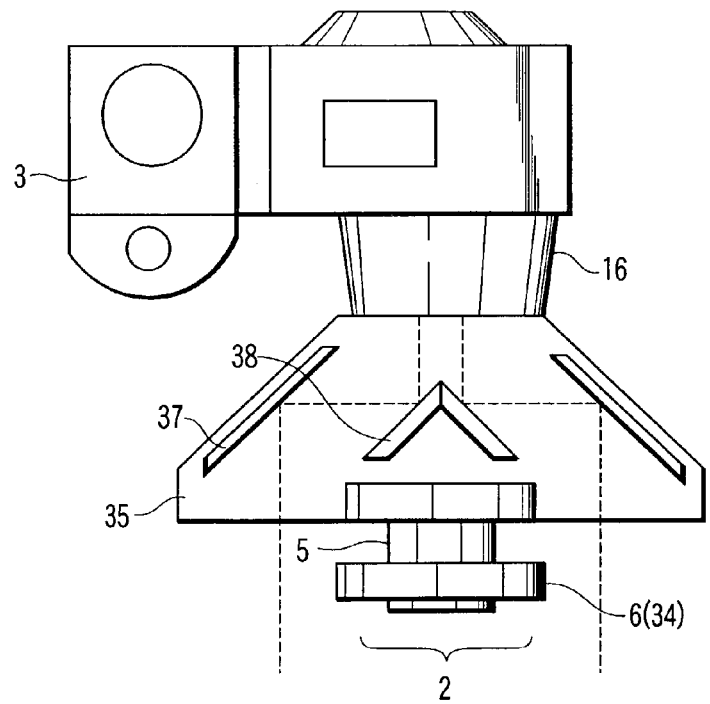
FIGS. 5A and 5B are a top view and a front view each showing a schematic configuration of a three-dimensional image photographing apparatus 1 according to a second embodiment of the present invention.
Figure 5B:
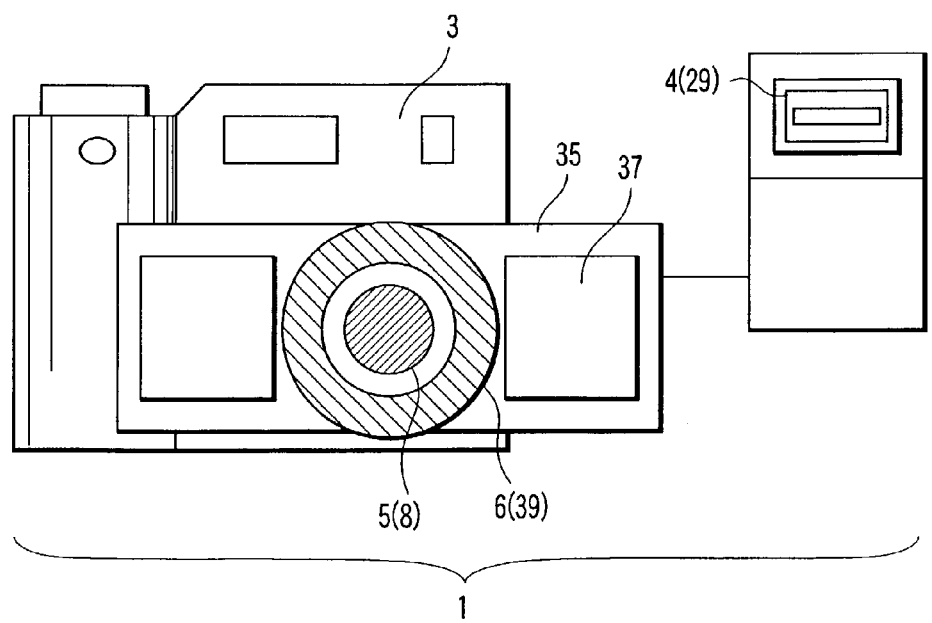

FIGS. 5A and 5B are a top view and a front view each showing a schematic configuration of the three-dimensional image photographing apparatus 1 according to the second embodiment.

Figure 6:
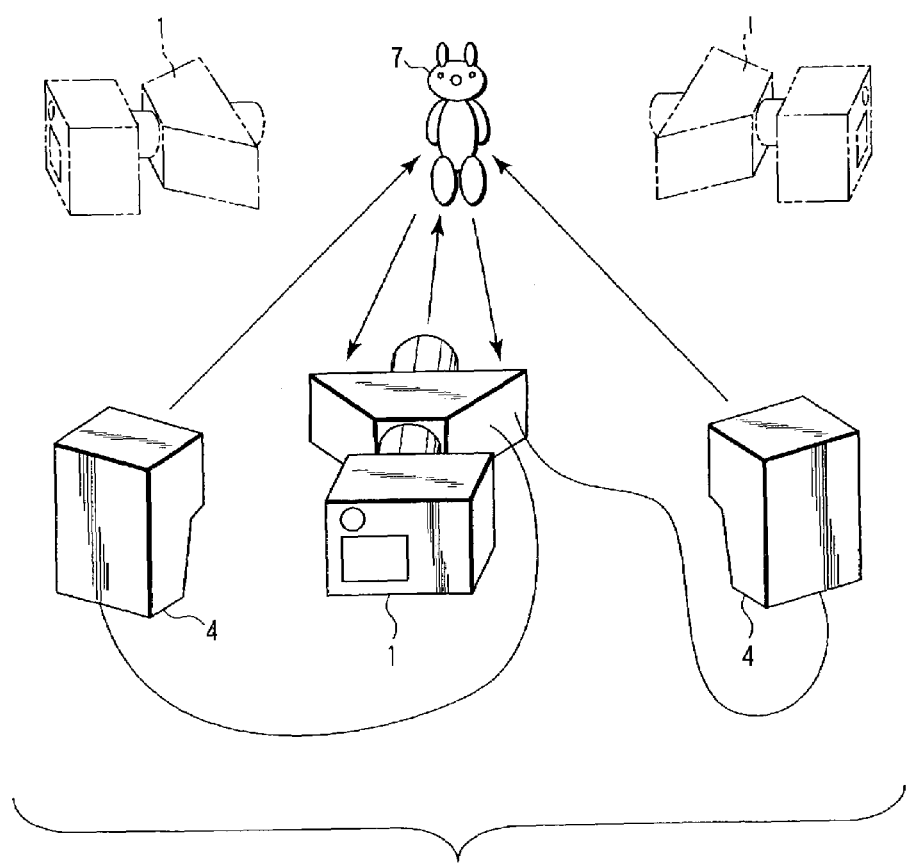
FIG. 6 is a view showing a state in which three-dimensional photographing is carried out relevant to an object by using the three-dimensional image photographing apparatus 1 according to the second embodiment of the invention.

FIG. 6 is a view showing a state in which three-dimensional image photographing is carried out relevant to an object 7 by using the three-dimensional image photographing apparatus 1 according to the second embodiment.

FIGS. 7A and 7B are views showing an azimuth difference image (as parallax image) 36 (32, 33) on an image pickup element obtained by a stereo adapter 35 for use in the three-dimensional image photographing apparatus 1 according to the second embodiment.

The three-dimensional image photographing apparatus 1 according to the second embodiment of the invention is configured as shown in FIGS. 5A and 5B.

That is, the three-dimensional image photographing apparatus 1 according to the present embodiment has a projection device 2, a photographing device 3 and an illumination device 4 in the same manner as that in the first embodiment described previously.

Therefore, in the three-dimensional image photographing apparatus 1 according to the present embodiment, the configuration of each portion (not shown) is provided in the same manner as that in the first embodiment described previously.

The photographing device 3 according to the present embodiment is capable of photographing the object 7 as an image from at least two or more viewpoints. The plurality of images are configured to enable implementation of a so-called stereoscopy for superimposing and photographing at least the same object front side from a distance which is spaced by a baseline length.

In the present embodiment, a pattern filter 8 of a projection optical system 5 has a random dot pattern classified by at least brightness for facilitating pattern matching in stereoscopy.

Here, the pattern filter 8 having a color random dot pattern in which RGB values are set at random is installed at the same position as the pattern filter 8 according to the first embodiment.

With the above described configuration, a three-dimensional shape is measured by a stereoscopic technique using random dot pattern projection.

In this case, the projection device 2 is disposed at a stereo adapter 35 described later, which is mounted on the photographing device 3.

Here, the stereo adapter 35 is mounted in front of a photographing optical system 16 of the photographing device 3 (hereinafter, referred to as a camera 3) in order to acquire an azimuth difference image.

The stereo adapter 35 is mounted in front of the image pickup optical system 16 of the camera 3 for use in forming an azimuth difference image 36 (32, 33) as shown in FIGS. 7A and 7B on an image pickup element of the camera 3.

The stereo adapter 35 is provided with two light receiving portions (first mirror optical system) 37 and a second mirror optical system 38. The two light receiving portions (first mirror optical system) 37 receive at a position spaced by a predetermined distance the light emitted from the projection optical system 5 or illumination optical system 6 of the projection device 2, the reflection light from the object 7 illuminated by the illumination device 4, or the light from the object 7 due to light emission of the object 7 itself. The second mirror optical system 38 guides to the image pickup optical system 16 each light received by the first mirror optical system 37.

In the present embodiment, the illumination optical system 5 is composed of a ring light 39.

In this case, the ring light 39 is provided so that, while the optical axis of the projection optical system 5 is coaxial, a light source is disposed at the periphery of the optical axis.

Now, the advantage of the three-dimensional image photographing apparatus 1 according to the second embodiment configured as shown in FIGS. 5A and 5B will be described with reference to FIGS. 6, 7A, and 7B.

First, during first photographing, a random dot pattern image projected from the projection optical system 5 is emitted to the object 7. The camera 3 photographs the image as the azimuth difference image 36 from the two light receiving portions 37 through the stereo adapter 35, thereby making it possible to obtain projection image data 32 with a projection pattern, the data having a random dot pattern.

Next, during second photographing, the light illuminating the object 7 by light emission of the ring light 39 by the switching circuit is picked up as the azimuth difference image 36 from the two light receiving portions 37 by the camera 3 through the stereo adapter 35.

In this manner, the surface image of the object 7 is photographed, and projection image data 36 without a projection pattern can be obtained.

Further, as in the first embodiment, a light emitting signal is sent to an external illumination connecting circuit 44 provided in a switching circuit 28 of the projection device 2, and third photographing is carried out.

Namely, in this case, illumination from a fixed light source is substantially carried out relevant to the object 7 by the illumination device 4, and texture image data 33 can be obtained.

Under this condition, as indicated by the broken line in FIG. 6, photographing in which viewing position has been changed is carried out, whereby there can be obtained texture image data 33 receiving more uniform illumination as well as only projection image data without a projection pattern due to the illumination caused by the illumination optical system 6 moving together with the camera 3.

Then, by a computing device (not shown), differentiation processing is carried out from projection image data 32 with a projection pattern and projection image data 31 without a pattern, and further, the step of extracting a pattern image 15 by this computing device and the step of generating a distance image from the corresponding point search between the right and left azimuth difference images 36 are executed, whereby three-dimensional shape data 34 of the object 7 can be obtained.

The corresponding texture image data 33 is superimposed on to this three-dimensional shape data 34, whereby a solid three-dimensional image 200 can be obtained.

Then, as in the first embodiment, a three-dimensional pasted image 204, for example, can be reconstructed by pasting a three-dimensional image 200 photographed by changing the viewing position at which the thus obtained texture image data 33 has been pasted.

In this case, the texture image data 30 photographed by fixing an illumination is used as a surface texture image 202, whereby a luminance difference at a pasting end 205 decreases in fusion of the texture image 202; there can be obtained an image suitable to pasting of the object 7 which depends on a change in distance thereof from the viewing position; and a more natural three-dimensional pasted image 204 can be obtained.

In addition to the above, the present embodiment has the following specific advantageous effect.

First, the illumination caused by the illumination optical system 6 according to the present embodiment is provided as an illumination from a light source that generally coincides with the projection optical system 5. Thus, the light distribution characteristics on the object 7 is approximated as those caused by projection.

Thus, for example, processing for highlighting a random dot pattern can be carried out by differentiation processing or the like such that projection image data without a projection pattern is subtracted from the projection image data 32 with a projection pattern based on a predetermined parameter.

In this manner, the effect of the object color is decreased, and the reliability of detecting the azimuth difference quantity caused by pattern matching is improved, thus enabling more robust three-dimensional reconstruction.

Various deformations and modifications, of course, can occur with each configuration according to the second embodiment of the invention.

For example, projective photographing with a projection pattern, projective photographing without a projection pattern, and illumination photographing may be carried out in accordance with any sequence. However, if photographing of texture image data 33 due to illumination, photographing of projection image data 32 with a projection pattern, and photographing of projection image data without a projection pattern are carried out in order, there can be prevented an error that closed-eye texture image data is photographed by second photographing after one's eye has been closed during first photographing due to flashing in photographing of a human being.

The illumination optical system 6 that is not a ring light 39 may be disposed to be proximal to the projection optical system 5.

In addition, in the above described embodiment, photographing is carried out three times from one viewpoint. However, in the case where three-dimensional image reconstruction can be sufficiently carried out by using only a projection image caused by the projection device 5, it is unnecessary to carry out photographing by using an illumination at the position of the camera 3 with the illumination optical system 6. It is sufficient to photograph two times from one viewpoint.

In this case, the illumination optical system 6 of the projection device 2 is eliminated. As an aspect of the projection device 2, there are provided a three-dimensional image photographing apparatus comprising an illumination device 4 fixed relevant to the object 7 and a projection optical system 5 mounted on the camera 3.

Third Embodiment

Now, a configuration of an apparatus and method for acquiring a three-dimensional image according to a third embodiment of the present invention will be described with reference to FIG. 8.

Figure 8:
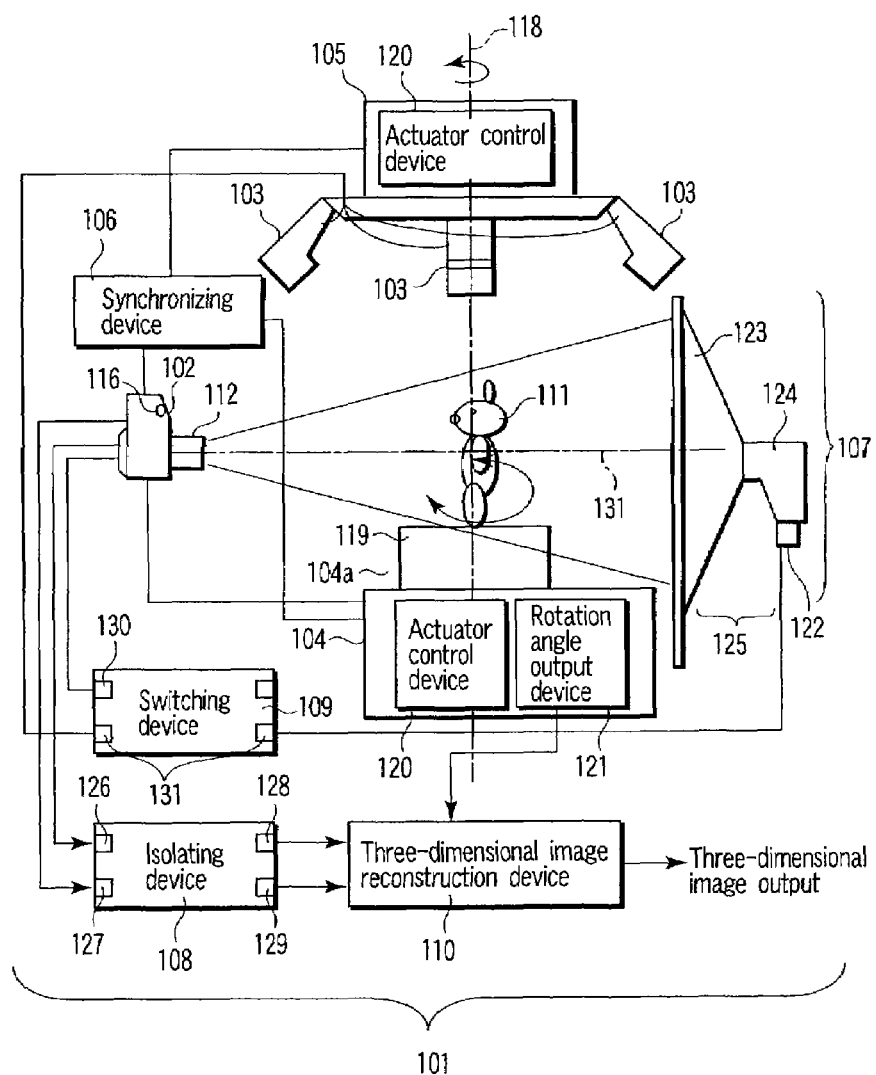
FIG. 8 is a side view showing a schematic configuration of a three-dimensional image photographing apparatus 101 according to a third embodiment of the present invention.

FIG. 8 is a side view showing a schematic configuration of the three-dimensional image photographing apparatus 101 according to the third embodiment of the invention.

The three-dimensional image photographing apparatus 101 according to the third embodiment of the invention is configured as follows.

Namely, the three-dimensional image photographing apparatus 101 comprises: an image pickup device 102; an illumination device 103; a rotating device 104; an illumination rotating device 105; a synchronizing device 106; a contour extracting device 107; an object isolating device 108; a switching device 109; and a three-dimensional image reconstruction device 110.

A three-dimensional shape of an object 111 is photographed by such a three-dimensional image photographing apparatus 101.

Now, the configuration of each section of the three-dimensional image photographing apparatus 101 according to the third embodiment will be described with reference to FIG. 8.

First, as the image pickup device 102, a digital still camera (hereinafter, referred to as a camera 102) is used as in the first and second embodiments described previously.

The camera 102 functions in the same way as those of the first and second embodiments described previously.

The camera 102 has an image pickup optical system 112, an image pickup element (not shown), a shutter (not shown), a diaphragm (not shown), a shutter button 116, an externally provided flash control terminal (hereinafter, referred to as an X synchronizing terminal and not shown).

The illumination device 103 uses a flash light emitting light source such as flash in order to decrease the effect of external light in the case of the present embodiment, thereby making it possible to carry out photographing by setting a fast shutter speed to the camera 102.

In addition, the rotating device 104 is disposed so as to rotate while the illumination rotating device 105 and a rotation axis 118 are coaxially provided.

The rotating device 104 has: a rotation table device 104a that includes a transparent photographing base 119 on which the object 111 is placed by using a rotating table or the like; and a rotation actuator control device 120 using a synchronous motor, a stepping motor or a servo motor as illustrated; a rotation angle output device 121; and the like.

In addition, the illumination rotating device 105 also has: a rotation actuator using a synchronous motor, a stepping motor or a servo motor; a control device 120; and a rotation angle output device (not shown) as in the rotating device 104.

In this illumination rotating device 105, the illumination device 103 is disposed at an arbitrary position suitable to the illumination of the object 111.

Then, by the synchronizing device 106, synchronization control between the rotating device 104 and the illumination rotating device 105 is carried out, whereby the rotation angle of these devices is controlled so as to be in the same phase.

In the meantime, an optical axis 131 of the camera 102 and a rotation axis 118 of the object 111 are disposed in different directions.

Preferably, as illustrated, the optical axis 131 of the camera 102 and the rotation axis 118 for rotational motion of the object 111 are disposed so as to form a substantially right angle or an angle close thereto.

This is because as many faces of the object 111 as possible can be photographed as an image together with rotational motion of the object 111 (so as to minimize an occlusion region).

Further, the contour extracting device 107 comprises a background illumination device 125 that includes an X synchronizing signal input device 122; a transparent (diffusing) screen 123; and a flash light emitting light source device 124 such as flash which emits light by the input of an X synchronizing signal.

In addition, the object isolating device 108 has a silhouette image input portion 126 and a texture image input portion 127. The silhouette image input portion 126 inputs a silhouette image 300 (refer to FIG. 9) illuminated by using the contour extracting device 107, the silhouette image being output from the camera 102. The texture image input portion 127 inputs a texture image 301 (refer to FIG. 9) illuminated by the illumination device 103.

The object isolating device 108 also has: a silhouette image data output portion 128 and a texture image data output portion 129. The silhouette image data output portion 128 extracts a boundary of an object region shaded by the background illumination device 125 from the silhouette image 300 obtained by photographing using the contour extracting device 107, and outputs silhouette image data 302 (refer to FIG. 9) that indicates a region in which the object 111 exists. The texture image data output portion 129 isolates the texture image 301 illuminated by the illuminating device 103 from the above boundary, and outputs the texture image data 303 (refer to FIG. 9) from the viewpoint of the object 111.

Further, the switching device 109 has a switching function for receiving an X synchronizing signal from the camera 102 at an X synchronizing input portion 130, and outputting X synchronizing signals alternately from an X synchronizing signal output portion 131, thereby switching the contour extracting device 107 to illumination device 103 and vice versa and switching photographing of the silhouette image data 302 to photographing of the texture image data 303 and vice versa.

In addition, the rotation table device 104a is provided so as to place the object 111 relevant to the camera 102 while the object 111 can be rotationally moved by the rotation axis 118 provided at an angle different from the direction of the optical axis 131 of the image pickup optical system 112 of the camera 102.

In this case, the camera 102 and the rotation table device 104a are fixed such that their positions are not shifted during photographing via a tripod, a floor or the like (not shown).

The contour extracting device 107 for contour extracting is installed such that the background illumination device 125 is set at a position different from the camera 102 while sandwiching the rotation table device 104a and at a background position such that both of them are included in the image pickup region of the camera 102 together with the object 111 on the rotation table device 104a.

The illumination device 103 is provided so as to coaxially rotate with the rotation axis 118 of the rotation table device 104a by the illumination rotating device 105.

The three-dimensional image reconstruction device 110 is provided to reconstruct a three-dimensional image, and then, output the reconstructed three-dimensional image, as described previously, based on the silhouette image data 302 outputted from the object isolating device 108, the texture image data 303, and the rotation angle information outputted from the rotation angle detecting device 121.

Now, the advantage of the thus configured three-dimensional image photographing apparatus 101 according to the third embodiment of the present invention will be described with reference to FIGS. 9 and 10.

Figure 9:
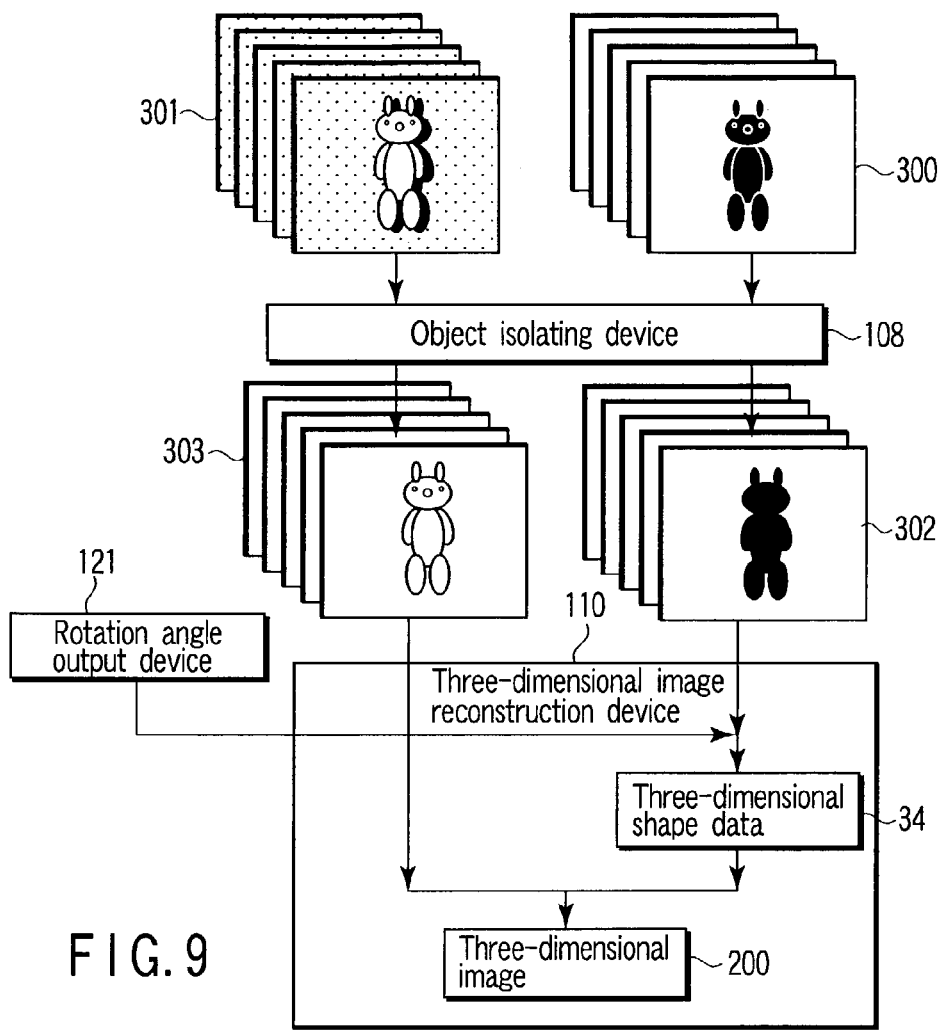
FIG. 9 is an operational flowchart adopted for explaining the effect of the three-dimensional image photographing apparatus 101 according to the third embodiment of the invention.

FIG. 9 is an operational flowchart adopted to illustrate the effect of the three-dimensional image photographing apparatus 101 according to the third embodiment of the invention.

Figure 10:
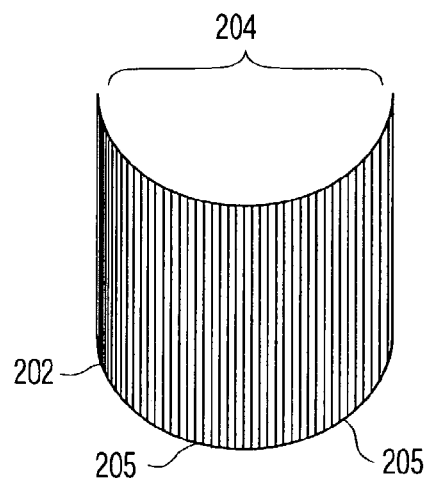
FIG. 10 is a view showing a state in which pasting of texture image data 303 is carried out when the texture image data 303 photographed by changing a viewing position according to the third embodiment of the invention is superimposed on three-dimensional shape data 34.

FIG. 10 is a view showing a state in which pasting of the texture image data 303 is carried out when the texture image data 303 photographed by changing a viewing position according to the three-dimensional image photographing apparatus 101 of the third embodiment is superimposed on the three-dimensional shape data 34

First, when first photographing is carried out by the three-dimensional image photographing apparatus 101 shown in FIG. 8, if a shutter is cut off by operating the shutter button 116 of the camera 102, an X synchronizing signal is output. Then, the X synchronizing signal is input to the switching device 109.

In this manner, the X synchronizing signal is outputted from the switching device 109 to the contour extracting device 107, and a silhouette image 300 of the shaded object 111 is photographed by the camera 102 as shown in FIG. 9.

The thus photographed silhouette image 300 is inputted to the object isolating device 108, and first silhouette image data 302 indicating a range in which the object 111 exists is obtained as shown in FIG. 9.

Next, during second photographing, if the shutter is cut off by operating the shutter button 116 of the camera 102, an X synchronizing signal is outputted again. Then, the X synchronizing signal is inputted to the switching device 109.

In this manner, when the X synchronizing signal is outputted from the switching device 109 to the illuminating device 103, the object 111 is illuminated by the illuminating device 103. Then, the illuminated object 111 is photographed as an image by means of the camera 102, whereby the texture image 301 as shown in FIG. 9 is photographed.

The thus photographed texture image 301 is inputted to the object isolating device 108, and the first texture image data 303 as shown in FIG. 9 can be obtained.

After the first and second photographings, the rotation table device 104a is rotated by means of the rotation actuator control device 120 by a predetermined angle obtained by n-dividing predetermined one cycle, and concurrently, the illumination rotating device 105 also is rotated by operation of the synchronizing device 106 by the same angle.

Then, as in the first and second photographings, third and fourth photographings are carried out; the second silhouette image data 302 and the texture image data 303 are obtained; and the rotation table device 104a is further rotated by a predetermined angle.

Such photographings are repeated by n times, whereby n items of silhouette image data 302 on the object 111 illuminated in a relatively fixed illumination state and the texture data 303 can be obtained by the illumination device 103 rotating in synchronism with the rotation table device 104a.

As shown in FIG. 9, the three-dimensional image reconstruction device 110 carries out isolation of a voxel space relevant to n items of silhouette image data 302 around the rotation axis 118, from contour information of the object 111 obtained from the texture image data 303 and silhouette image data 302 and rotational position information outputted from the rotation angle output device 121 of the rotation table 104. In this manner, three-dimensional data 34 is reconstructed in accordance with a silhouette technique for computing a three-dimensional shape isolated all around the shape of a rotating body.

In response to this three-dimensional shape data 34, the texture image data 303 illuminated by the illumination device 103 is pasted as a texture image to be pasted according to an image photographing viewpoint, whereby a three-dimensional image 200 can be obtained.

In this process, when the texture image data 303 photographed as an image by changing a viewing position is superimposed on the three-dimensional shape data 34, pasting of the texture image data 303 is carried out.

This pasting is carried out as shown in FIG. 10. As in production of the first and second texture images 202, there can be obtained a more natural three-dimensional pasted image 204 with a small luminance difference at the pasting end 205.

Various deformations or modifications, of course, can occur with each configuration according to the third embodiment of the invention.

For example, the illumination rotating device 105 and the rotating table device 104a may be configured so as to be in synchronism with each other by mechanical connection.

Figure 11:
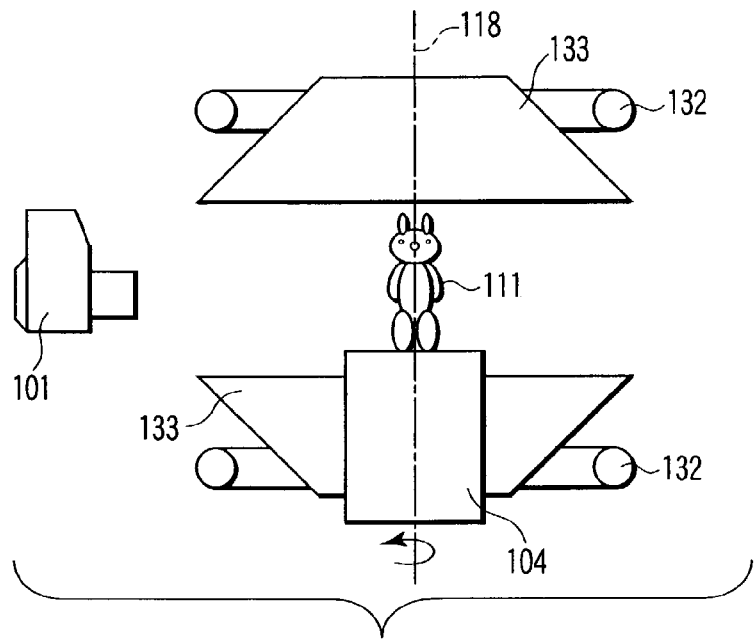
FIG. 11 is a view showing a modified example of the three-dimensional image photographing apparatus 101 according to the third embodiment of the invention.

As shown in FIG. 11, as in the illumination device 103 that includes a diffuser 133 rotationally symmetrical to a ring illumination 132 around a rotation axis, the illumination device is provided to be axially symmetrical to the rotation axis 118 of the rotation table 104. In the case where uniform illumination can be achieved around the axis, the same advantageous effect can be attained even without rotation caused by the rotating device.

Figure 12:
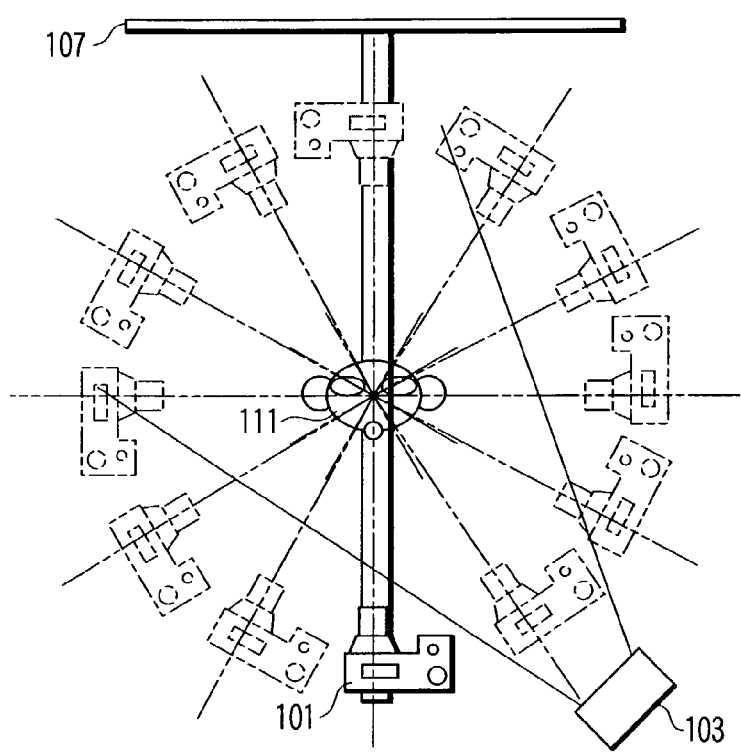
FIG. 12 is a view showing a modified example of the three-dimensional image photographing apparatus 101 according to the third embodiment of the invention.

Further, as shown in FIG. 12, the side of the camera and contour extracting device 107 is rotated around the rotation axis 118, whereby the same advantageous effect as that of the rotating table 104 can be attained.

The contour extracting device 107 and object isolating device 108, the extracting device 107 having the background illumination device 125, have been used for isolating the silhouette image data 302 or texture image data 303 of the object. However, there can be used: conventional chroma-key processing using a blue back; a method using a background image difference capable of measuring the shape of a contour even without a background; or a scheme using two-dimensional image segmentation.

Moreover, an object of the present invention is to acquire texture image data 303 suitable to pasting. Thus, three-dimensional shape data 34 may be reconstructed using a stereo technique for rotation around the rotation axis 118. Any method can be used with respect to a technique for acquiring the three-dimensional shape data 34 that corresponds to the texture image data 303.

In addition, as a matter common to the foregoing embodiments, it is preferable to keep constant camera photographing parameters such as focus, exposure, and white balance.

Therefore, as has been described above, according to the present invention, there can be provided a three-dimensional image photographing apparatus and method considering texture image pasting and decreasing the cost of computer correction processing when three-dimensional texture images are pasted from different viewpoints, the apparatus and method being capable of acquiring a more natural pasted three-dimensional image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional image photographing apparatus for acquiring an image which includes shape information and texture information regarding an object, and acquiring a three-dimensional image of the object by utilizing the image that includes the shape information and the texture information, the apparatus comprising:

a pattern projection device which comprises a pattern filter which has a pattern to be projected on the object, an optical system and a light source for projection, which project the pattern of the pattern filter on the object;

a first illumination device which comprises an optical system and a light source for illumination, which illuminates the object, with the pattern not projected thereon, the optical system having an optical axis to the object, which is parallel to an optical axis of the optical system of the pattern projection device;

an image photographing device which is fixed apart from the pattern projection device by a predetermined distance to have a predetermined positional relationship with the projection device and the first illumination device, and which photographs the object;

a second illumination device which is fixed in a predetermined position with respect to the object, comprises an optical system and a light source for illumination, and illuminates the objects; and a switching device which effects switching for turning on/off the pattern projection light source, the light source for illumination of the first illumination device, and the light source for illumination of the second illumination device, wherein:

the three-dimensional image photographing apparatus photographs the object from a specific rotation direction position to acquire (i) projection image data not having a projection pattern of the object, which is obtained, with the light source for illumination of the first illumination device turned on, (ii) projection image data having a projection pattern of the object, which is obtained, with the light source for projection of the pattern projection device turned on, and (iii) a texture image of the object, which is obtained, with the light source for illumination of the second illumination device turned on;

when acquisition of the projection image data not having the projection pattern, the projection image data having the projection pattern and the texture image is completed, a viewing position of a rotation direction position of the image photographing device is changed relative to the object, the three-dimensional image photographing apparatus re-acquires (i) projection image data not having the projection pattern of the object, which is obtained, with the light source for illumination of the first illumination device turned on, (ii) projection image data having the projection pattern of the object, which is obtained, with the light source for projection of the pattern projection device turned on, and (iii) a texture image of the object, which is obtained, with the light source for illumination of the second illumination device turned on, thereby acquiring a plurality of projection image data not having the projection pattern, a plurality of projection image data having the projection pattern and a plurality of texture images, which are obtained by photographing the object from a plurality of rotation direction positions with respect to the object; and the three-dimensional image photographing apparatus acquires a three-dimensional shape data on the object on the basis of the projection image data having the projection pattern and the projection image data not having the projection pattern, and superimposes the texture image on the three-dimensional shape data to obtain a three-dimensional image corresponding to photographing which is carried out, with the viewing position changed.

* * * * *